United States Patent
Bakke et al.

(10) Patent No.: US 7,363,382 B1
(45) Date of Patent: Apr. 22, 2008

(54) APPARATUS, METHODS, AND ARTICLES INCORPORATING MULTIPLE PATH FAILOVER DRIVER MECHANISM

(75) Inventors: Mark A. Bakke, Maple Grove, MN (US); Scott M. Ferris, Edina, MN (US); Bradley Scott Johnson, Hanover, MN (US); Charles Steven Rissmeyer, Coon Rapids, MN (US)

(73) Assignee: Cisco Technology, Inc., San Jose, CA (US)

( * ) Notice: Subject to any disclaimer, the term of this patent is extended or adjusted under 35 U.S.C. 154(b) by 727 days.

(21) Appl. No.: 10/403,783

(22) Filed: Mar. 31, 2003

(51) Int. Cl.
*G06F 15/13* (2006.01)

(52) U.S. Cl. .............. 709/230; 709/239; 370/216; 711/148

(58) Field of Classification Search ............ 709/230, 709/239; 370/216; 711/148
See application file for complete search history.

(56) References Cited

U.S. PATENT DOCUMENTS

| | | | |
|---|---|---|---|
| 6,915,354 B1 * | 7/2005 | Ozdemir et al. ............ 710/5 |
| 6,938,092 B2 * | 8/2005 | Burns ...................... 709/230 |
| 6,976,134 B1 * | 12/2005 | Lolayekar et al. .......... 711/148 |
| 2003/0093559 A1 * | 5/2003 | Ichinohe et al. ............ 709/239 |
| 2003/0193890 A1 * | 10/2003 | Tsillas et al. ............... 370/216 |

* cited by examiner

*Primary Examiner*—Nathan Flynn
*Assistant Examiner*—Jinsong Hu
(74) *Attorney, Agent, or Firm*—Schwegman, Lundberg & Woessner, P.A.

(57) ABSTRACT

A system and method of maintaining connectivity between a host computer and a target on a storage router. A failover driver is established in a stack of an operating system of the host computer. A first network connection is established between the host computer and the target on the storage router. The failover driver monitors connectivity information associated with the first network connection and, if failure of the first network connection is detected, establishes a second network connection between the host computer and the target on the storage router.

15 Claims, 5 Drawing Sheets

APPARATUS, METHODS, AND ARTICLES INCORPORATING MULTIPLE PATH FAILOVER DRIVER MECHANISM

TECHNICAL FIELD

The present invention relates generally to networks of computers and more particularly to accessing a device at a remote computer via a network.

BACKGROUND

Computer systems need a way to store and retrieve data from a variety of data devices made by various manufacturers, such as disk drives, printers, display screens, scanners, and so on. In the past, each computer typically had its own directly-attached devices, which no other computer was capable of using. But, this was a cumbersome and expensive design because sharing data among computers was difficult and a particular device might stay idle and unused for lengthy periods.

In order to overcome the aforementioned cumbersome and expensive solutions, computers are connected in networks, and one computer (often called a client or a host) is allowed to store and retrieve data from another computer's (often called server) devices. Many clients have a need for their data to always be available. In order to ensure high availability of the data, some networks have built-in redundancy with multiple paths or connections via multiple servers to a device, so that if one path fails, the device may be still accessible through another path.

Multiple paths are used to help ensure that a connection between the computing device and the network is still viable even if one or more of the paths fail. Failover operations help maintain "normal" operations even when problems caused by interrupted service, etc. arise in the network. In addition, multiple paths provide the capacity for load balancing. Load balancing consists of dividing the amount of work that needs to be done between two or more paths (or components), to achieve higher efficiency. Load balancing can be implemented with hardware, software, or a combination of both.

Typical multiple path software provides the functionality for both failover processing and load balancing. However, such multiple path software requires using a proprietary manufacturer's disk specific multiple path failover driver implemented on the driver stack of host computers. For example, EMC storage array will require an EMC disk specific multiple path failover driver implemented on a host computer driver stack to connect to an alternate path, IBM storage array will require an IBM disk specific multiple path failover driver to be implemented on the host computer driver stack to connect to an alternative path, and so on.

The problem with using the manufacturer disk specific failover drivers is they can be very expensive and can require special proprietary manufacturer specific commands to access storage arrays. Furthermore, using the manufacturer disk specific failover drivers can limit the host computers to using their own storage arrays. This is because of the requirement of using proprietary commands to communicate with the storage router when a failover occurs.

Often, users are not willing to pay such a steep price for obtaining the failover and load balancing features of multiple path input/output (I/O) software. In addition, users often will not require all of the features provided by an expensive multiple path I/O software package, but may still desire a reliable multiple path implementation. Furthermore, users do not want to be limited to using storage arrays of a single manufacturer, they would prefer to use storage arrays made by different manufacturers to suit their needs.

Thus, there is a need for a technique that can connect to a target by seeking an alternate path to maintain connectivity, when the selected path fails, without having to use such manufacturer specific failover drivers in the driver stack of an operating system of a host computer. Further, there is a need for a technique that is not dependent on using a specific manufacturer's storage array. Furthermore, there is a need for a cheap and reliable multiple path processing technique.

SUMMARY

The present invention provides solutions to the above-described shortcomings in conventional approaches, as well as other advantages apparent from the description below. A system and method of maintaining connectivity between a host computer and a target on a storage router is described. A failover driver is established in a stack of an operating system of the host computer. A first network connection is established between the host computer and the target on the storage router. The failover driver monitors connectivity information associated with the first network connection and, if failure of the first network connection is detected, establishing a second network connection between the host computer and the target on the storage router.

DETAILED DESCRIPTION OF EXEMPLARY EMBODIMENTS

Systems and methods for cheap and reliable multiple path processing are described herein. In the following detailed description of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims. The terms "network connection", "path", and "data path" are used throughout the document interchangeably.

Figure 1:
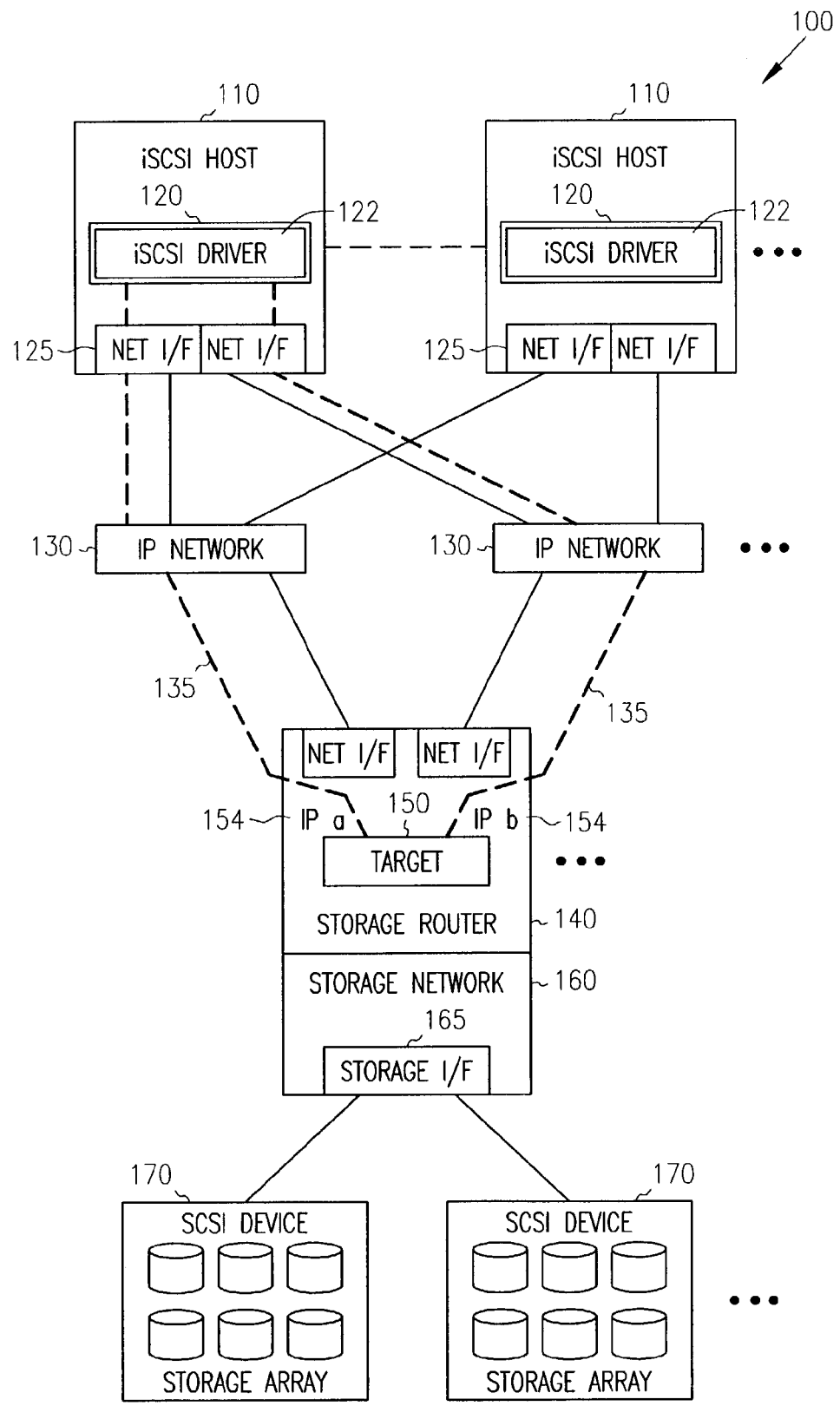
FIG. 1 depicts a block diagram of exemplary network, according to an embodiment of the present invention.

FIG. 1 is a functional block diagram of a SCSI-based storage network system 100 having a storage router 140 coupled between one or more host computers 110 and one or more storage arrays 170 through multiple IP networks 130. In the embodiment shown in FIG. 1, host computers 110 are iSCSI-based host computers connected (e.g., as servers) via one or more IP networks 130 to storage router 140. Each of the host computers 110 includes one or more IP Network Interfaces (Net I/Fs) 125.

The storage router 140 is connected in turn to a storage network 160. The storage network 160 is coupled to one or more storage arrays 170 through storage interfaces (Storage I/F) 165. In the embodiment shown in FIG. 1, storage arrays 170 can be made by any manufacturer, such as IBM, EMC, HP, and so on. As shown in FIG. 1, storage router 140 includes one or more Net I/Fs 142. Net I/F 142 receives iSCSI PDUs (Protocol Data Units) from the one or more IP networks 130, extracts SCSI commands, data, and/or status information from each of the iSCSI packets and sends the extracted packets to Storage I/Fs 165. Each of the extracted SCSI commands, data, and/or status information is then delivered to its designated SCSI device 170. Also shown in FIG. 1, each of the iSCSI host computers 110 includes an operating system 120 having an iSCSI driver 122. In addition, FIG. 1 shows a target 150 and IP addresses IPa and IPb 154, respectively.

In one embodiment, one or more iSCSI drivers 122 formulate storage commands as if to their own SCSI devices. The commands are placed in IP packets and passed over one or more IP networks 130 and are received by Net I/Fs 142, which strip off TCP/IP headers. The storage router 140 then maps the target 150 to one of the IP addresses IPa and IPb 154. In these embodiments, iSCSI driver 122 provides IP access to each of the storage arrays 170 via the storage router 140. The SCSI routing occurs in the storage router 140 via the mapping of storage arrays 170 to targets 150. A target (also called logical target) is an arbitrary name for a group of storage arrays 170. A target can be mapped to multiple storage arrays 170.

As can be seen in FIG. 1, two data paths 135, i.e., two network connections, are available for iSCSI driver 122 to connect to the target 150 in the storage router 140. Multiple paths such as these are used to help ensure that a connection between a computing device, for example a host computer 110, and a network, for example IP network 130, is still viable even if one or more of the data paths 135 fail. Failover operations help maintain "normal" operations even when problems caused by interrupted service, etc. arise in the network system 100.

Figure 2:
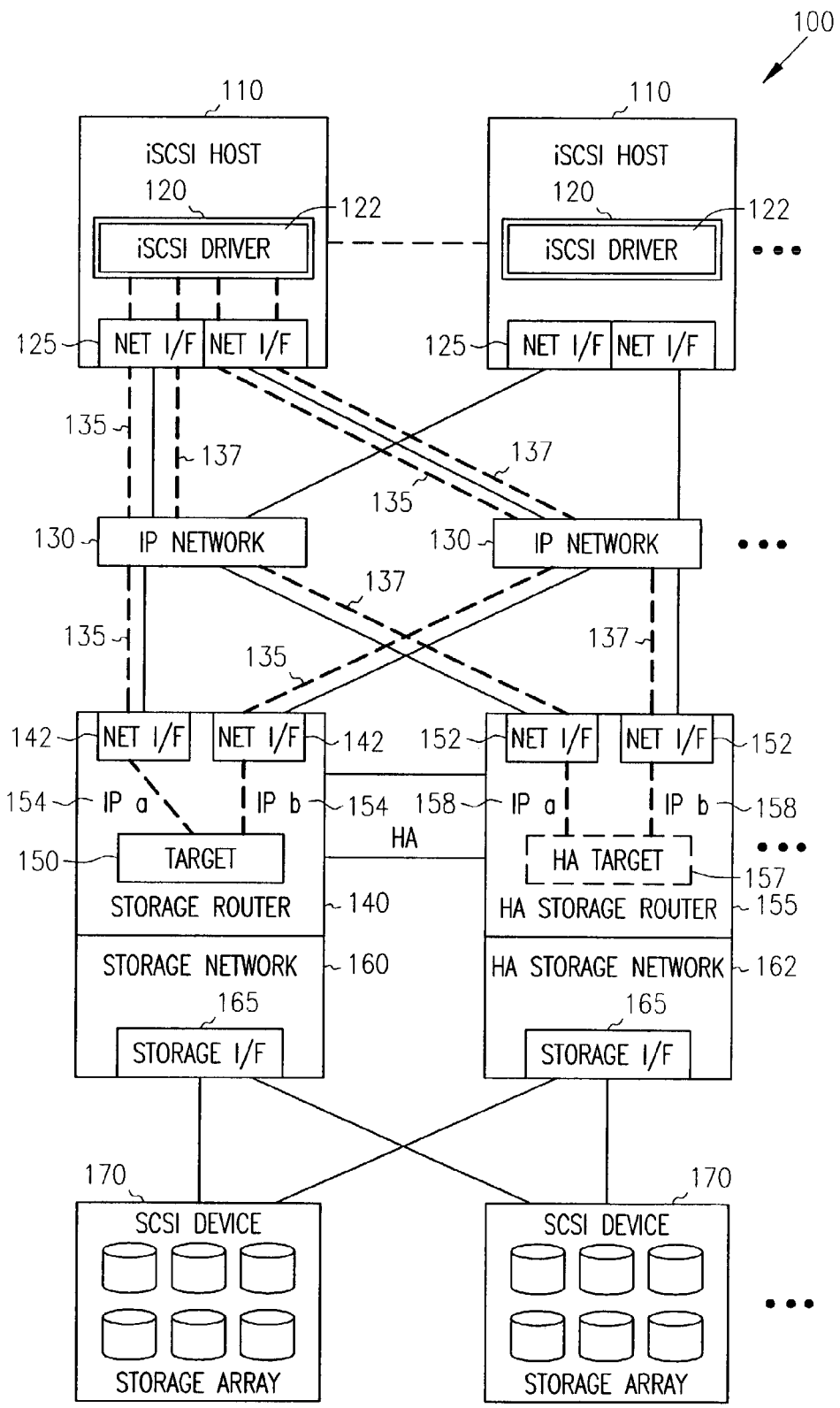
FIG. 2 depicts a block diagram of another exemplary network, according to an embodiment of the present invention.

FIG. 2 is a functional block diagram, similar to the functional block diagram shown in FIG. 1, except in addition to what is shown in FIG. 1, FIG. 2 shows a high availability (HA) storage router 155 and HA storage network 165 coupled to the IP networks 130 and the storage arrays 170. The IP networks 130 are coupled via HA Network Interfaces 152 to HA storage router 155. In one embodiment, HA storage router 155 is a clone of the storage router 140. In other embodiments, however, redundant storage router 155 can differ substantially in form and/or capability from the storage router 140. In addition to the two data paths 135 shown in FIG. 1, FIG. 2 shows two additional data paths 137 that are available for the iSCSI driver 122 to select and connect to HA storage router 155.

Generally the HA storage router 155, the HA target 157, and the HA storage network 162, including the data paths 137 are in a standby mode and they are activated only when the storage router 140 fails. Many networks have a need for the data to be always available. In order to ensure high availability of the data, in one embodiment networks have built-in redundancy, such as the additional data paths 137 configured with HA storage router 155, HA storage network 160, and so on, so that if one path fails, the device is still accessible through another path. Also shown in FIG. 2, are HA Storage I/Fs 165. As shown in FIG. 2, IP Network 137 is coupled to HA storage router 155 through Net I/Fs 152.

Figure 3:
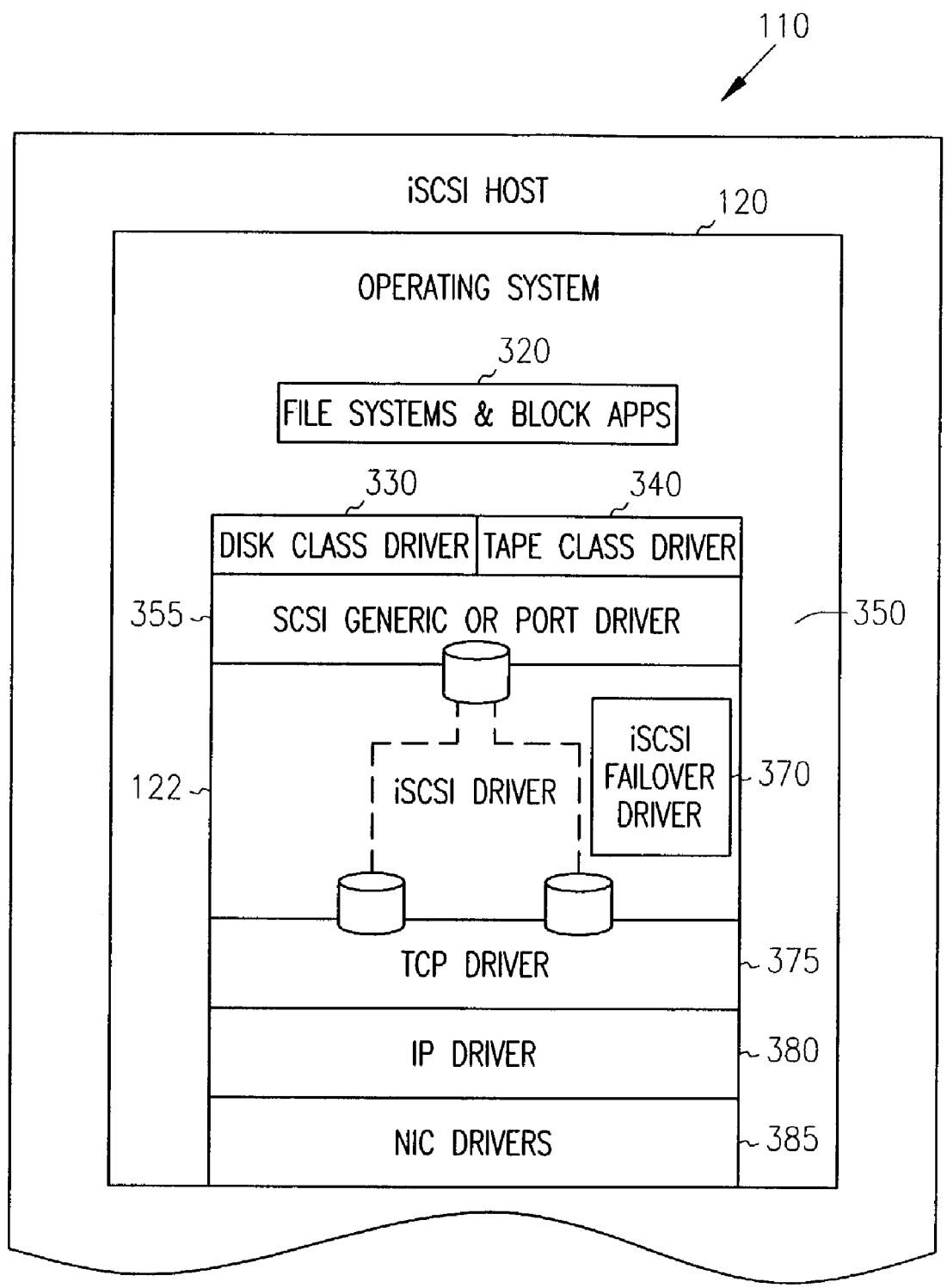
FIG. 3 is a block diagram of detail of various drivers stored in an operating system of a host computer, according to an embodiment of the present invention.

FIG. 3 is a block diagram of detail of various drivers, i.e., of a driver stack, stored in the operating system 120 of one of the host computers 110. In the embodiment shown in FIG. 3, the driver stack 350 includes a Disk Class Driver 330, a Tape Class Driver 340, a SCSI Generic Driver 355, the iSCSI Driver 122, TCP/IP Drivers 375 and 380, and NIC Drivers 385. In addition, FIG. 3 shows the iSCSI Driver 122 including an iSCSI failover driver 370. The operating system 120 further includes file systems and block apps 320.

In operation, when a request to connect one of the host computers 110 to a storage array 170 is received, the iSCSI Driver 122 selects one of the data paths 135 as a first network connection to connect the host computer 110 to a target 150 using one of the Net I/Fs 125, one of the IP networks 130, and one of the storage router Net I/Fs 142. The iSCSI Driver 122 then connects the host computer 110 to the target 150 via the first network connection or data path. The iSCSI failover driver 370 then monitors the first network connection to maintain connectivity between the host computer 110 and the target 150.

In some embodiments, iSCSI failover driver 370 selects one of multiple targets (e.g., targets 150 and 157) using one of multiple IP addresses (e.g., addresses 154 and 158) available in the storage routers 140 and 155 as a first IP address. The iSCSI failover driver 370 then searches each of the multiple network connections 135 and 137 available to establish the first network connection between the host computer 110 and the selected target via the selected first IP address. The iSCSI failover driver 370 then establishes a network connection between the host computer 110 and the selected target via the first network connection using the first IP address.

If, for example, target 150 is selected, in one embodiment the iSCSI failover driver 370 monitors the first network connection by receiving connectivity information from the target 150. The iSCSI failover driver 370 then continues to maintain the connectivity between the host computer 110 and the target via the first network connection as long as the received connectivity information indicates a good network connection. The connectivity information received from the storage router 140 can include a response to a PDU, such as a "ping" sent by the iSCSI failover driver 370, a response sent by the storage router 140 in return for receiving a storage command, TCP/IP data packets, and so on from the iSCSI driver 122.

The iSCSI failover driver 370 reconnects the host computer 110 to the target 150 via the first network connection, when the received connectivity information indicates a failed network connection with the first network connection. In some embodiments, the iSCSI failover driver 370 determines a failed connection based on not receiving a response from the storage router 140 within a predetermined amount of time.

In one such embodiment, the iSCSI failover driver 370 sends a PDU, i.e. a ping, and when the iSCSI failover driver 370 receives a response to the sent PDU within the predetermined amount of time, and then the iSCSI failover driver 370 maintains the first network connection. If the iSCSI failover driver 370 does not receive a response within the predetermined amount of time then the iSCSI failover driver 370 drops the first network connection and establishes a second network connection between the host computer 110 and the target 150 using a second network connection.

In one embodiment, the iSCSI failover driver 370 selects a second IP address from the multiple IP addresses 154 available in the storage router 140 and uses the second IP address to connect the host computer 110 to the target 150 when the received connectivity information indicates a manual failover requested by a user. In addition, the iSCSI failover driver 370 selects a second network connection from the multiple network connections 135 available using the second IP address. The iSCSI failover driver 370 then connects the host computer 110 to the target 150 via the second network connection and continues to monitor the second network connection to maintain connectivity between the host computer 110 and the target 150.

Figure 4:
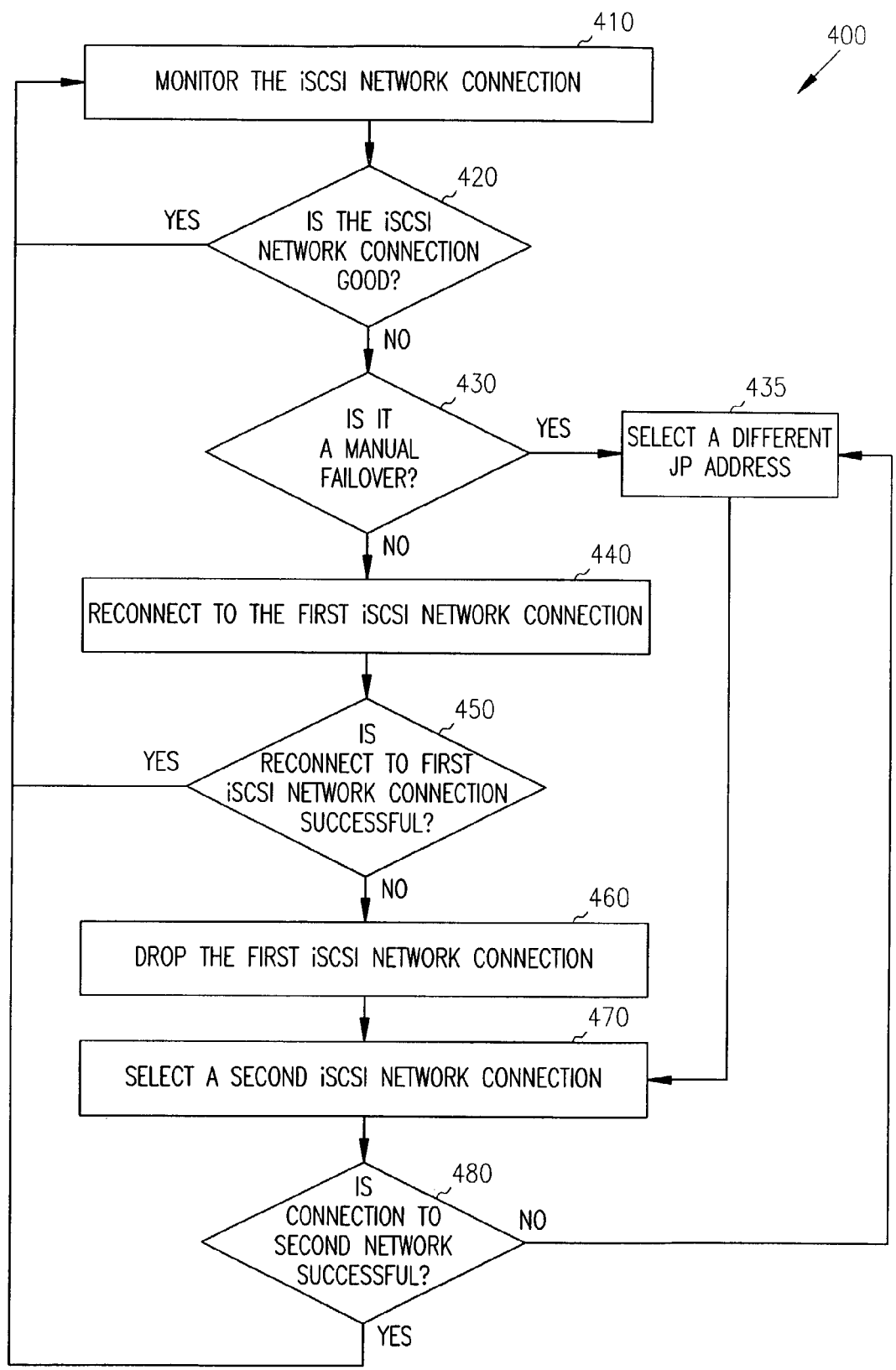
FIG. 4 depicts a flowchart that describes the operation of the generic multiple path failover driver, according to an embodiment of the present invention.

FIG. 4 is a flowchart 400 that describes the operation of the generic multiple path failover driver, in accordance with one embodiment of the present invention. Flowchart 400 includes blocks 410-480, which are arranged serially in the exemplary embodiment. However, other embodiments of the subject matter may execute two or more blocks in parallel, using multiple processors or a single processor organized as two or more virtual machines or subprocessors. Moreover, still other embodiments implement the blocks as two or more specific interconnected hardware modules with related control and data signals communicated between and through the modules, or as portions of an application-specific integrated circuit. Thus, the exemplary process flow is applicable to software, firmware, and/or hardware implementations.

Block 410 monitors connectivity information received from one of an active iSCSI network connection, a first network connection, in multiple network connections between one of multiple host computers and a target, using a first IP address, in a storage router in a network. Connectivity information can include receiving failed indicators, such as manual failover requested by a user, iSCSI PDU (iSCSI Protocol Data Unit) timeout, a TCP/RST (Transmission Control Protocol/Reset) reset by the target, and a TCP FIN (Transport Control Protocol/Final) closed by the target and so on in case of a failed and/or bad network connection.

In some embodiments, block 410 includes selecting a first path from one of multiple paths in the network to connect one of the multiple host computers to the target in a storage router. Further, block 410 establishes a first network connection using the selected first path to send data to a storage array and receives connectivity information regarding the first path.

In one embodiment, if the iSCSI driver is able to send commands to a target and receive responses from the target then the iSCSI failover driver considers the first network connection is good and the session is alive. If the iSCSI failover driver does not receive any response from the target via the first network connection within a predetermined amount of time, then the iSCSI failover driver sends an iSCSI PDU, also referred to as a "ping or NO-OP", to the target via the first network connection. If the iSCSI failover driver receives a response to the iSCSI PDU within a pre-determined amount of time from the target, then the iSCSI failover driver considers the first network connection as good and continues to monitor the health of the first network connection. If the iSCSI failover driver does not receive a response within a predetermined amount of time, then the iSCSI failover driver considers the active connection as failed and/or bad.

The iSCSI PDU timeout can also occur when there are no commands to be sent by the TCP/IP driver. In one embodiment, the iSCSI failover driver sends the iSCSI PDU to the target to check the health of the first network connection. In such a case the target has to send something back to the iSCSI failover driver in response to receiving the iSCSI PDU. If the iSCSI failover driver does not receive any information within a predetermined amount of time from the target in response to the iSCSI PDU sent by the iSCSI failover driver, then the iSCSI PDU timeout occurs and is considered a failed/bad network connection.

Block 420 checks to see whether the first network connection is good based on the connectivity information received from the target. If the received connectivity information indicates a good first network connection the iSCSI failover driver goes back to block 410 to continue monitoring the health of the first network connection. If the connectivity information indicates a failed and/or bad connection then the iSCSI failover driver goes to block 430.

Block 430 checks whether the connectivity information indicates a manual failover was requested by a user. If the connectivity information indicates a manual failover was requested by a user, then the iSCSI failover driver goes to block 435. Block 435 then selects a second IP address (e.g., IPB 154) and goes to block 460 to drop the first network connection (if needed) and to block 470 to establish a second network connection between the host computer and the target using the second IP address. In some embodiments, block 435 selects a second portal and goes to block 460 to drop the first network connection (if needed) and to block 470 to establish a second network connection between the host computer and the target using the second portal. If the connectivity information does not indicate a manual failover then the iSCSI failover driver goes to block 440.

Block 440 tries to reconnect the host computer to the target using the first network connection. In some embodiments, the iSCSI failover driver sends a ping to the target using the first network to determine the health of the first network connection. Based on the response received from the target by the iSCSI failover driver then the iSCSI failover driver reconnects the host computer to the target using the network connection. In these embodiments, the iSCSI failover driver reconnects to a TCP/IP network.

Block 450 then checks whether the reconnection via the first network connection was successful. If the reconnection via the first network connection was successful then the iSCSI failover driver goes to bock 410 to continue monitoring the health of the first network connection. If the reconnection via the first network connection was not successful then the iSCSI failover driver goes to block 460.

Block 460 drops the first network connection. In some embodiments, for example, block 460 drops the TCP/IP network connection. Block 470 then selects a second network connection using the same IP address to connect the host computer to the target. Block 480 checks whether the second network connection is good. If the second network connection is good then the iSCSI failover driver goes to block 410 to continue monitoring the network connection. If the second network connection is not good then the iSCSI failover driver goes to block 435 to select a different IP address to connect the host computer to the target.

The iSCSI failover driver continues to monitor the selected network connection and repeats the above-described process to maintain connectivity between the host computer and the target using one of the multiple network connections and one of multiple IP addresses, such that the process of monitoring and maintaining connectivity is transparent to the iSCSI driver. This method provides a generic failover driver that can be implemented in a host computer that is not specific to a manufacturer's device to maintain connectivity between the host computer and a storage device by selecting an alternative available path, when a selected path fails.

Figure 5:
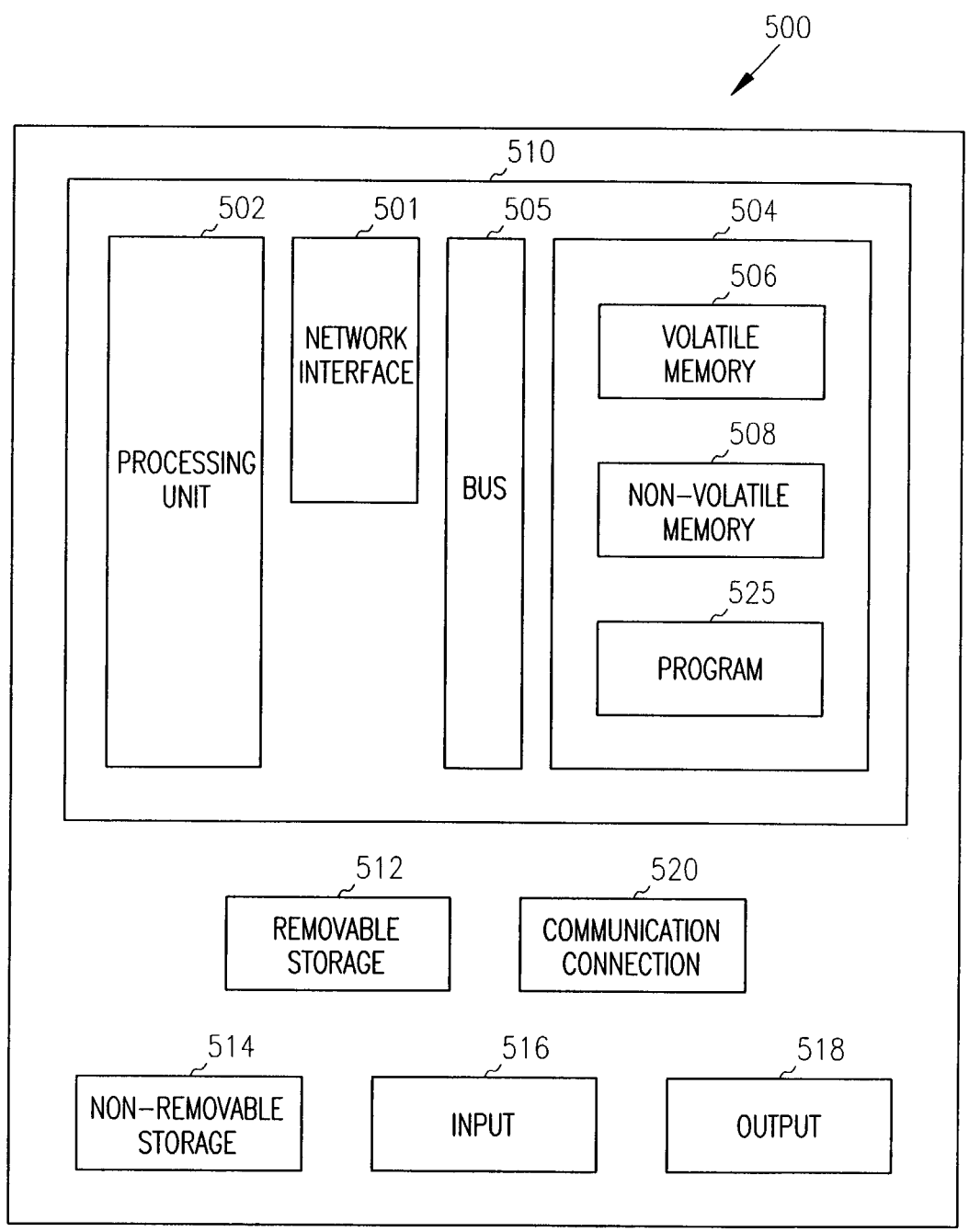
FIG. 5 shows an example of a suitable computing system environment for implementing embodiments of the present invention, such as those shown in FIGS. 1, 2, 3, and 4.

FIG. 5 shows an example of a suitable computing system environment for implementing embodiments of the present subject matter. FIG. 5 and the following discussion are intended to provide a brief, general description of a suitable computing environment in which certain embodiments of the inventive concepts contained herein may be implemented.

A general computing device in the form of a computer 510 may include a processing unit 502, memory 504, removable storage 512, and non-removable storage 514. The memory 504 may include volatile memory 506 and non-volatile memory 508. Computer 510 may include—or have access to a computing environment that includes—a variety of computer-readable media, such as volatile memory 506 and non-volatile memory 508, removable storage 512 and non-removable storage 514.

Computer storage can include any suitable memory device(s) for storing data and machine-readable instructions, such as read only memory (ROM), random access memory (RAM), erasable programmable read only memory (EPROM), electrically erasable programmable read only memory (EEPROM); hard drive; removable media drive for handling compact disks (CDs), digital versatile disks (DVDs), diskettes, magnetic tape cartridges, memory cards, memory sticks, and the like; chemical storage; biological storage; and other types of data storage.

Computer 510 may include or have access to a computing environment that includes one or more input elements 516, one or more output elements 518, and one or more communication connections 520. The computer 510 may operate in a networked environment using the communication connection 520 to connect to one or more remote computers. A remote computer may include a personal computer, server, router, network PC, a peer device or other common network node, and/or the like. The communication connection may include a Local Area Network (LAN), a Wide Area Network (WAN), and/or other networks.

"Processor" or "processing unit", as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit. The term also includes embedded controllers, such as Generic or Programmable Logic Devices or Arrays, Application-Specific Integrated Circuits, single-chip computers, smart cards, and the like.

Embodiments of the invention may be implemented in conjunction with program modules, including functions, procedures, data structures, application programs, etc., for performing tasks, or defining abstract data types or low-level hardware contexts. Program modules may be stored in memory 504 and associated storage media of the type(s) mentioned above.

Computer 510 may also include a multiple path generic failover driver according to the teachings of the present invention. Machine-readable instructions stored on any of the above-mentioned storage media are executable by the processing unit 502 of the computer 510. For example, a computer program 525 comprising machine-readable instructions capable of monitoring and maintaining a network connection between one of multiple host computers and a target in a storage router that is transparent to the iSCSI driver to provide a cheaper and reliable multiple path processing technique, according to the teachings of the present subject matter. The computer program 525 may be included on a CD-ROM and loaded from the CD-ROM to a hard drive.

CONCLUSION

The above-described methods and apparatus provide various embodiments to reduce the cost of selecting an alternative available path in a network to access a storage array when the selected path fails.

It is to be understood that the above description is intended to be illustrative, and not restrictive. Many other embodiments will be apparent to those of skill in the art upon reviewing the above description. The scope of the subject matter should, therefore, be determined with reference to the following claims, along with the full scope of equivalents to which such claims are entitled.

As shown herein, the present invention can be implemented in a number of different embodiments, including various methods, a circuit, an I/O device, a system, and an article comprising a machine-accessible medium having associated instructions.

Other embodiments will be readily apparent to those of ordinary skill in the art. The elements, algorithms, and sequence of operations can all be varied to suit particular requirements. The operations described above with respect to the apparatus and methods illustrated in FIGS. 1, 2, 3, and 4 can be performed in a different order from those shown and described herein.

FIGS. 1-5 are merely representational and are not drawn to scale. Certain proportions thereof may be exaggerated, while others may be minimized. FIGS. 1-5 are intended to illustrate various embodiments of the invention that can be understood and appropriately carried out by those of ordinary skill in the art.

It is emphasized that the Abstract is provided to comply with 37 C.F.R. § 1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description of Exemplary Embodiments, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description of Exemplary Embodiments, with each claim standing on its own as a separate preferred embodiment.

The invention claimed is:

1. A method of maintaining connectivity between a host computer and a target on a storage router, comprising:
   establishing a failover driver implemented in a stack of an operating system of the host computer;
   establishing a first network connection between the host computer and the target on the storage router;
   monitoring, via the failover driver, connectivity information associated with the first network connection;

if failure of the first network connection is detected, establishing a second network connection between the host computer and the target on the storage router;

wherein the failover driver comprises an internet small computer system interface (iSCSI) failover driver, and wherein the connectivity information comprises information selected from the group consisting of a response to a protocol data unit (PDU) sent by the iSCSI failover driver, a response to commands sent by the iSCSI driver, and a response to TCP packets sent by the iSCSI driver.

2. The method of claim 1, wherein failure is detected when failure events occur, wherein the failure events are selected from the group consisting of a manual failover requested by the user, an iSCSI PDU (iSCSI Protocol Data Unit) timeout, a TCP/RST (Transmission Control Protocol/Reset) reset by the target, and a TCP FIN (Transport Control Protocol/Final) closed by the target.

3. The method of claim 1, wherein the target comprises a target address of any of a plurality of storage devices manufactured by any of a plurality of manufacturers.

4. The method of claim 1 further comprising:
selecting a second target on the storage router;
establishing a network connection between the host computer and the second target;
monitoring, via the failover driver, connectivity information associated with the network connection between the host computer and the second target; and
if failure of the network connection between the host computer and the second target is detected, establishing a second network connection between the host computer and the second target on the storage router.

5. The method of claim 4, wherein the failover driver comprises an internet small computer system interface (iSCSI) failover driver.

6. The method of claim 5, wherein the connectivity information comprises information selected from the group consisting of a response to a protocol data unit (PDU) sent by the iSCSI failover driver, a response to commands sent by the iSCSI driver, and a response to TCP packets sent by the iSCSI driver.

7. The method of claim 5, wherein failure is detected when failure events occur, wherein the failure events are selected from the group consisting of a manual failover requested by the user, an iSCSI PDU (iSCSI Protocol Data Unit) timeout, a TCP/RST (Transmission Control Protocol/Reset) reset by one of the targets, and a TCP FIN (Transport Control Protocol/Final) closed by one of the targets.

8. The method of claim 5, further comprising:
dropping a TCP/IP network connection, when the network connection fails;
reconnecting the TCP/IP network connection using the first network connection; and
establishing a new TCP/IP network connection using a second network connection to connect to the target using the iSCSI failover driver, when reconnection via the first network connections fails.

9. The method of claim 5, further comprising:
selecting a different portal, when a manual failover is requested by a user;
finding a second network connection using the different portal;
reconnecting the host computer to the target using the second network connection;
if the reconnection using the second network connection was successful, then monitoring the second network connection; and if the reconnection using the second network connection was not successful, then selecting another IP address and reconnecting the host computer to the target using the other IP address.

10. A method for multiple paths processing in a network having a plurality of host computers, including a first host computer having an internet small computer system interface (iSCSI) failover driver, comprising:
selecting a first path from a plurality of paths to connect the first host computer to a target on a storage router;
establishing a network connection over the first path to a storage array;
receiving connectivity information regarding the first path from the target;
if the received connectivity information indicates a good network connection, then maintaining the network connection over the first path; and
if the received connectivity information indicates a failed connection, then selecting one of the plurality of paths as a reconnection path and reconnecting the first host computer using the reconnection path in order to maintain connectivity between the first host computer and the target;
wherein the reconnection path comprises an internet small computer system interface (iSCSI) failover driver, and wherein the connectivity information comprises information selected from the group consisting of a response to a protocol data unit (PDU) sent by the iSCSI failover driver, a response to commands sent by the iSCSI driver, and a response to TCP packets sent by the iSCSI driver.

11. The method of claim 10, wherein selecting one of the plurality of paths as a reconnection path comprises:
if the received connectivity information indicates a failed connection, then reconnecting the first host computer to the target via the first path using the iSCSI failover driver; and
if the reconnection to the first path fails, then connecting the first host computer to the target via a second path using the iSCSI failover driver in order to maintain connectivity between the first host computer and the target.

12. The method of claim 11, wherein reconnecting the first host computer to the target via the first path comprises:
sending a PDU by the iSCSI failover driver to the target; and
monitoring the sent PDU for a response from the target within a predetermined amount of time.

13. An article, comprising:
a storage medium having instructions that when executed by a computing platform, result in execution of a method of maintaining connectivity between a host computer and a target on a storage router, comprising:
establishing a failover driver implemented in a stack of an operating system of the host computer;
establishing a first network connection between the host computer and the target on the storage router;
monitoring, via the failover driver, connectivity information associated with the first network connection;
if failure of the first network connection is detected, establishing a second network connection between the host computer and the target on the storage router;
wherein the failover driver comprises an internet small computer system interface (iSCSI) failover driver, and wherein the connectivity information comprises information selected from the group consisting of a response to a protocol data unit (PDU) sent by the iSCSI failover driver, a response to commands sent by the iSCSI driver, and a response to TCP packets sent by the iSCSI driver.

14. The article of claim 13, wherein failure is detected when failure events occur, wherein the failure events are selected from the group consisting of a manual failover requested by the user, an iSCSI PDU (iSCSI Protocol Data Unit) timeout, a TCP/RST (Transmission Control Protocol/Reset) reset by the target, and a TCP FIN (Transport Control Protocol/Final) closed by the target.

15. The article of claim 13, wherein the method further comprises:

selecting a second target on the storage router;

establishing a network connection between the host computer and the second target;

monitoring, via the failover driver, connectivity information associated with the network connection between the host computer and the second target; and if failure of the network connection between the host computer and the second target is detected, establishing a second network connection between the host computer and the second target on the storage router.

* * * * *